United States Patent
Wang et al.

(10) Patent No.: US 12,167,741 B2
(45) Date of Patent: Dec. 17, 2024

(54) METHOD FOR IMPROVING STABILITY OF ANTHOCYANIN

(71) Applicant: CHINA AGRICULTURAL UNIVERSITY, Beijing (CN)

(72) Inventors: Yongtao Wang, Beijing (CN); Xiaojun Liao, Beijing (CN); Liang Zhao, Beijing (CN); Yuwan Li, Beijing (CN)

(73) Assignee: CHINA AGRICULTURAL UNIVERSITY, Beijing (CN)

( * ) Notice: Subject to any disclaimer, the term of this patent is extended or adjusted under 35 U.S.C. 154(b) by 771 days.

(21) Appl. No.: 17/416,347

(22) PCT Filed: Oct. 23, 2019

(86) PCT No.: PCT/CN2019/112661
§ 371 (c)(1),
(2) Date: Jun. 18, 2021

(87) PCT Pub. No.: WO2021/035913
PCT Pub. Date: Mar. 4, 2021

(65) Prior Publication Data
US 2022/0071242 A1   Mar. 10, 2022

(30) Foreign Application Priority Data

Aug. 29, 2019 (CN) .......................... 201910807043.3

(51) Int. Cl.
*A23L 3/3544* (2006.01)
*A23L 5/43* (2016.01)
(Continued)

(52) U.S. Cl.
CPC ............... *A23L 3/3544* (2013.01); *A23L 5/43* (2016.08); *A23L 33/105* (2016.08); *A23L 33/125* (2016.08)

(58) Field of Classification Search
CPC ........ A23L 3/3544; A23L 5/43; A23L 33/105; A23L 33/125; A23L 2/52; A23L 3/0155;
(Continued)

(56) References Cited

FOREIGN PATENT DOCUMENTS

| CN | 106690304 A | 5/2017 |
| CN | 109730318 A | 5/2019 |

(Continued)

OTHER PUBLICATIONS

Wang et al. "A Study of Controlled Uptake and Release of Anthocyanins by Oxidized Starch Microgels", J. Agric. Food Chem. 2013, 61, 24, 5880-5887 (Year: 2013).*

(Continued)

*Primary Examiner* — Andrew J. Oyer
(74) *Attorney, Agent, or Firm* — HAUPTMAN HAM, LLP

(57) ABSTRACT

The present invention relates to the technical field of food science and engineering, and specifically to a method for improving the stability of anthocyanins. In the method, a starch and an anthocyanin are mixed in an aqueous solution of hydrochloric acid, treated at a certain high hydrostatic pressure condition to enable the starch to be gelatinized and to interact with the anthocyanin, and then stored at a certain temperature, so that interaction between the anthocyanin and the starch is further enhanced to form a complex. The method can improve the stability of anthocyanins, which helps to improve the quality of products and extend the shelf life of products.

10 Claims, 2 Drawing Sheets

(51) Int. Cl.
  *A23L 33/105* (2016.01)
  *A23L 33/125* (2016.01)
(58) Field of Classification Search
  CPC ........ A23L 3/3562; A23L 27/60; A23L 27/50;
  A23L 33/21; A23V 2002/00
  See application file for complete search history.

(56) References Cited

FOREIGN PATENT DOCUMENTS

JP     S63-43959 A    2/1988
JP     2011-51933 A   3/2011

OTHER PUBLICATIONS

Ferrari et al. "The effects of high hydrostatic pressure on the polyphenols and anthocyanins in red fruit products" Procedia Food Science 1 (2011) 847-853 (Year: 2011).*
International Search Report issued in corresponding International No. PCT/CN2019/112661, China National Intellectual Property Administration, Beijing, China, dated Mar. 13, 2020; 6 pgs.

* cited by examiner

METHOD FOR IMPROVING STABILITY OF ANTHOCYANIN

RELATED APPLICATIONS

The present application is a National Phase of International Application Number PCT/CN2019/112661 filed Oct. 23, 2019 and claims priority to Chinese Application Number 201910807043.3 filed Aug. 29, 2019.

FIELD OF THE INVENTION

The present invention belongs to the technical field of food science and engineering, and specifically relates to a method for improving stability of anthocyanins.

BACKGROUND OF THE INVENTION

Anthocyanins are a class of water-soluble natural pigments widely found in plants, and are flavonoid compounds. Anthocyanins are very beneficial to human health. For example, they are useful in eliminating free radicals in human body, and have anti-tumor, anti-cancer, anti-inflammatory, diabetes prevention, weight reducing, vision protecting effects, etc. Anthocyanins, however, are very unstable. Foods rich in anthocyanins, when being processed and during storage, are easily affected by factors such as processing methods, pH values, temperatures, light, oxygen, enzymes, sulfur dioxide, metal ions, which can result in degradation of anthocyanins, shorten the shelf life and reduce the quality of products. To maintain the stability of anthocyanins during processing and storage of foods has therefore become one of the key factors in ensuring the quality of products, and has always been a hot point in research on anthocyanins.

Methods of maintaining the stability of anthocyanins during processing and storage of foods mainly include intramolecular or intermolecular copigmentation reactions, chemical modification, bioengineering techniques, interaction of macromolecules with anthocyanins, etc. Among them, intramolecular or intermolecular copigmentation reactions have a low rate; chemical modification has the problem of residual organic reagents; and bioengineering techniques have not yet been industrialized. These methods therefore more or less have limitations. At present, the most popular method in practical applications is to form complexes through interaction of macromolecules with anthocyanins.

Current studies have shown that anthocyanins can enter starch granules and interact with double helix molecular chains of amylose inside the starch granules, thereby protecting anthocyanins. However, due to limited size of water channels on starch granules, it is difficult for some large-molecular-weight active substances to enter the starch granules, which leads to weak protective effects and very low interaction efficiency. Therefore, it has become a focus of research as to whether it is possible to protect anthocyanins by increasing the efficiency of interaction between anthocyanins and starch under the condition that the anthocyanins are in an unmodified state (natural state) to form complexes.

SUMMARY OF THE INVENTION

In order to solve the above technical problems, the present invention provides a method for improving stability of anthocyanins, which solves the problem of easy degradation of anthocyanins in food systems.

The method for improving stability of anthocyanins provided by the present invention includes the following steps of:

1) adding starch to an aqueous solution of hydrochloric acid to form starch solution, adding anthocyanins to the starch solution to form a system, and subjecting the system to high hydrostatic pressure treatment; and
2) subjecting the mixture obtained from the high hydrostatic pressure treatment to low-temperature storage.

In step 1) of the above method, the starch may be potato starch, corn starch, amylose, and amylopectin, etc., specifically amylose or potato starch, more specifically amylose.

The aqueous solution of hydrochloric acid may have a pH value of 3 to 5.

A mass-volume ratio of the starch to the aqueous solution of hydrochloric acid may be (0.001-0.1) (g): 1 (ml).

The anthocyanin may be an anthocyanin monomer or a glycosylated/acylated anthocyanin (such as pelargonidin, cyanidin-3-O-glucoside, etc.), or may be a small-molecular-weight aggregate of an anthocyanin, or may be a mixture or a crude extract of anthocyanins.

The resulting system may have a concentration of the anthocyanin of $10^{-6}$ to $10^{-1}$ g/L.

The high hydrostatic pressure treatment may be conducted at a pressure which may be 100 to 600 MPa, specifically 300 to 600 MPa, 400 to 600 MPa, or 500 to 600 MPa, more specifically 600 MPa.

The high hydrostatic pressure treatment is conducted for a time period of 1 to 20 minutes, specifically 5 to 15 minutes, more specifically 10 minutes.

The high hydrostatic pressure treatment may be conducted at conditions which may specifically be 300 MPa for 10 minutes, 400 MPa for 10 minutes, or 600 MPa for 10 minutes, more specifically 600 MPa for 10 minutes.

In step 2) of the above method, the low-temperature storage may be conducted at a temperature of 0 to 10° C. and maintained for a time period of 0 to 30 days (the endpoint value 0 is not be adopted), and specifically conducted at a temperature of 4° C. and maintained for a time period of 10 days.

The above method may further include an operation of subjecting a system obtained from the low-temperature storage to centrifugal separation to collect a liquid starch-anthocyanin complex.

The above operation may further include an operation of freeze drying the obtained liquid starch-anthocyanin complex to obtain a solid anthocyanin-starch complex.

Use of the above liquid starch-anthocyanin complex or the above solid anthocyanin-starch complex in the field of food processing is also within the protection scope of the present invention.

Use of the above method for improving stability of anthocyanins in processing and storage of foods rich in anthocyanins is also within the protection scope of the present invention.

In the present invention, the interaction between the anthocyanin and the starch is enhanced by mixing the starch and the anthocyanin in the aqueous solution of hydrochloric acid, treating the resulting system at a certain high hydrostatic pressure condition to enable the starch to be gelatinized and to interact with the anthocyanin, and then storing the resulting mixture at a certain temperature. In this way, the stability of the anthocyanin is strengthened, which helps to extend the shelf life of products and improve the quality of products.

The present invention brings the following beneficial effects.

(1) In the present invention, high hydrostatic pressure treatment is utilized to open the double helix structure of the starch to improve the interaction efficiency between the starch and the anthocyanin. Then aging of the starch is accelerated to enhance the interaction between the starch and the anthocyanin, which can further improve the stability of the anthocyanin. This helps to extend the shelf life of products and improve quality of products.

(2) The anthocyanin in the present invention is a natural pigment and is beneficial to human physiological functions in a variety of ways. The starch after being aged can also inhibit colon cancer, decrease cholesterol, and reduce the incidence of cardiovascular diseases.

DETAILED DESCRIPTION OF THE EMBODIMENTS

Figure 1:
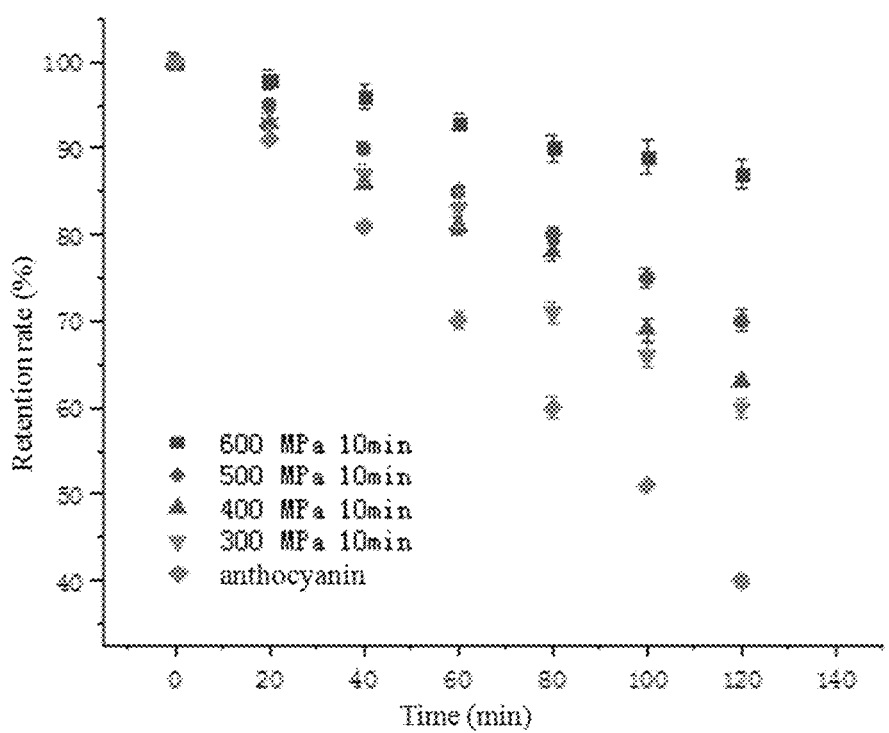
FIG. 1 is a graph showing thermal stability of anthocyanin-starch complexes formed under different high hydrostatic pressure treatment conditions.

The present invention will be described below through specific embodiments. The present invention, however, is not limited to these specific embodiments.

Experimental methods used in the following embodiments are conventional methods unless otherwise specified. Reagents and materials used in the following embodiments are commercially available unless otherwise specified.

Main Materials and Instruments Used in the Embodiments:

Amylose, potato starch, corn starch, and cyanidin-3-O-glucoside purchased from Sigma reagent company, electronic pH meter, high hydrostatic pressure equipment, centrifuge, freeze dryer, etc.

Example 1

(1) 0.15 g of amylose was measured and added into 25 mL of an aqueous solution of hydrochloric acid (pH=3) to obtain an amylose solution, followed by addition of 100 μL of an anthocyanin (cyanidin-3-O-glucoside) (1 mg/mL) to the resulting amylose solution. The resulting system was treated for 10 minutes at 300 MPa.

(2) The sample obtained from the high hydrostatic pressure treatment was stored at 4° C. for 10 days. Then the resulting complex was centrifuged (10,000 g, 10 minutes) and freeze dried at −18° C. for 24 hours to obtain an anthocyanin-starch complex.

Example 2

(1) 0.25 g of amylose was measured and added into 25 mL of an aqueous solution of hydrochloric acid (pH=3) to obtain an amylose solution, followed by addition of 100 μL of an anthocyanin (cyanidin-3-O-glucoside) (1 mg/mL) to the amylose solution. The resulting system was treated for 10 minutes at 400 MPa.

(2) The sample obtained from the high hydrostatic pressure treatment was stored at 4° C. for 10 days. Then the resulting complex was centrifuged (10,000 g, 10 minutes) and freeze dried at −18° C. for 24 hours to obtain an anthocyanin-starch complex.

Example 3

(1) 0.75 g of potato starch was measured and added into 25 mL of an aqueous solution of hydrochloric acid (pH-3) to obtain a potato starch solution, followed by addition of 100 μL of an anthocyanin (cyanidin-3-O-glucoside) (1 mg/mL) to the potato starch solution. The resulting system was treated for 10 minutes at 300 MPa.

(2) The sample obtained from the high hydrostatic pressure treatment was stored at 4° C. for 10 days. Then the resulting complex was centrifuged (10,000 g, 10 minutes) and freeze dried at −18° C. for 24 hours to obtain an anthocyanin-starch complex.

Example 4

(1) 0.75 g of potato starch was measured and added into 25 mL of an aqueous solution of hydrochloric acid (pH=3) to obtain a potato starch solution, followed by addition of 200 μL of an anthocyanin (cyanidin-3-O-glucoside) (1 mg/mL) to the potato starch solution. The resulting system was treated for 10 minutes at 300 MPa.

(2) The sample obtained from the high hydrostatic pressure treatment was stored at 4° C. for a certain period of time. Then the resulting complex was centrifuged (10,000 g, 10 minutes) and freeze dried at −18° C. for 24 hours to obtain an anthocyanin-starch complex.

Effect Example 0.25 g of potato starch was measured and added into 25 mL of an aqueous solution of hydrochloric acid (pH=3) to obtain a potato starch solution, followed by addition of 200 μL of an anthocyanin (cyanidin-3-O-glucoside) (1 mg/mL) to the potato starch solution. The resulting system was divided into four equal parts which were subjected to treatment for 10 minutes respectively at 300 MPa, 400 MPa, 500 MPa, 600 MPa. The samples obtained from respective high hydrostatic pressure treatment each were stored at 4° C. for 10 days. After that, the resulting complexes each were centrifuged (10,000 g, 10 minutes) and then freeze dried at −18° C. for 24 hours to obtain corresponding anthocyanin-starch complexes.

The obtained complexes each were dissolved in 0.15 M aqueous solution of sodium hydroxide and placed in a water bath at 90° C. for 120 minutes. An ultraviolet-visible spectrophotometer was used to measure absorbance of each of resulting solutions at 520 nm respectively at 0, 20, 40, 60, 80, 100, 120 minutes.

$$\text{Retention rate} = A_1/A_0$$

$A_0$ is an absorbance value at 0 minute, and $A_1$ is an absorbance value after the water bath.

FIG. 1 is a graph showing thermal stability of the anthocyanin (cyanidin-3-O-glucoside)-starch (potato starch) complexes formed under different high hydrostatic pressure treatment conditions.

As shown in FIG. 1, all the high hydrostatic pressure treatment (at pressure of 300 MPa, 400 MPa, 500 MPa, or 600 MPa) can improve the thermal stability of the anthocyanin, and as the pressure of the high hydrostatic pressure treatment increases, the stability of the anthocyanin increases. The anthocyanin-starch complex obtained from the treatment at 600 MPa for 10 minutes has the highest thermal stability, and its thermal stability is only reduced by about 10% after treatment at 90° C. for 120 minutes.

0.25 g of amylose, 0.25 g of amylopectin, 0.25 g of potato starch, and 0.25 g of corn starch were measured respectively and each were added into an aqueous solution of hydrochloric acid (pH=3) to obtain corresponding starch solutions, followed by addition of 200 μL of an anthocyanin (cyanidin-3-O-glucoside) (1 mg/mL) to each of the resulting corresponding starch solutions. Resulting systems each were subjected to treatment for 10 minutes at 600 MPa. After samples obtained from the high hydrostatic pressure treatment each were stored at 4° C. for 10 days, resulting complexes each were centrifuged (10,000 g, 10 minutes) and then freeze dried at −18° C. for 24 hours to obtain corresponding anthocyanin-starch complexes.

The obtained complexes each were dissolved in 0.15 M aqueous solution of sodium hydroxide and placed in a water bath at 90° C. for 120 minutes. An ultraviolet-visible spectrophotometer was used to measure absorbance of each of the solutions at 520 nm respectively at 0, 20, 40, 60, 80, 100, 120 minutes.

Retention rate=$A_1/A_0$ $A_0$ is an absorbance value at 0 minute, and $A_1$ is an absorbance value after the water bath.

Figure 2:
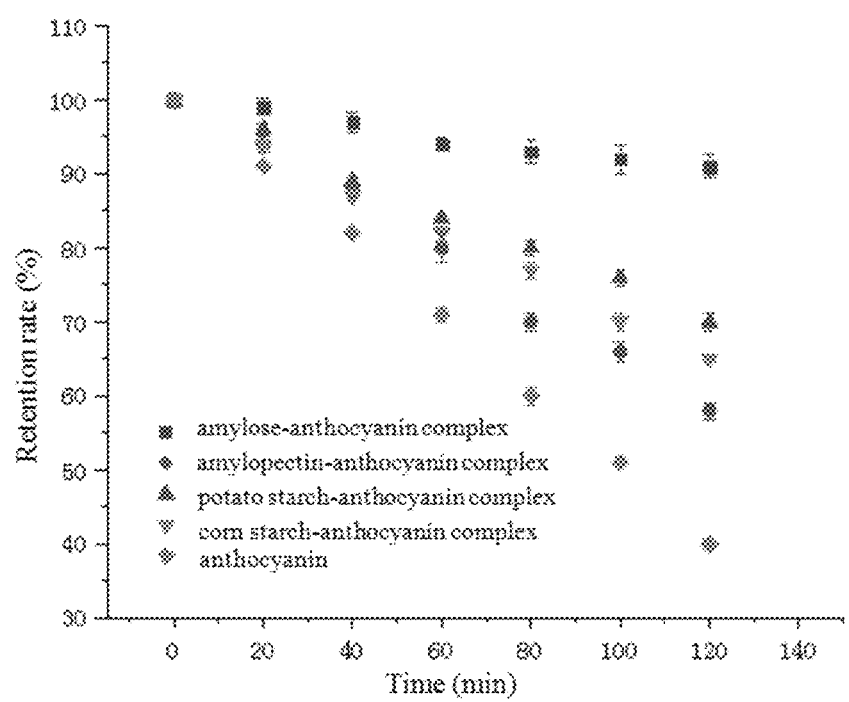
FIG. 2 is a graph showing thermal stability of anthocyanin-starch complexes formed by treating different types of starches at high hydrostatic pressure of 600 MPa for 10 minutes.

FIG. 2 is a graph showing thermal stability of the anthocyanin-starch complexes formed by treating different types of starches at high hydrostatic pressure of 600 MPa for 10 minutes.

As shown in FIG. 2, all these different types of starches treated at the high hydrostatic pressure of 600 MPa for 10 minutes improve the stability of the anthocyanin (cyanidin-3-O-glucoside). After treatment at 90° C. for 120 minutes, the retention rate of the anthocyanin is still above 60%. The anthocyanin-starch complex formed by treating the anthocyanin with amylose at 600 MPa for 10 minutes has the highest stability (the retention rate of anthocyanin is still above 90% after the treatment at 90° C. for 120 minutes), followed by the anthocyanin-starch complex formed by the anthocyanin treated with potato starch.

As can be seen, the types of starches and the conditions of high hydrostatic pressure treatment have varying degrees of influence on the improvement of stability of the anthocyanin.

The above described is only preferred embodiments of the present invention and is not intended to limit the present invention. Any modification, equivalent replacement, improvement, etc. made within the spirit and principles of the present invention shall fall within the protection scope of the present invention.

INDUSTRIAL APPLICATION

In the present invention, the interaction between the anthocyanin and the starch is enhanced by mixing the starch and the anthocyanin in the aqueous solution of hydrochloric acid, treating the resulting system at a certain high hydrostatic pressure condition to enable the starch to be gelatinized and to interact with the anthocyanin, and then storing the resulting mixture at a certain temperature. In this way, the stability of the anthocyanin is strengthened, which helps to extend the shelf life of products and improve the quality of products.

The invention claimed is:

1. A method for improving stability of an anthocyanin, comprising the following steps:
   1) Adding a starch to an aqueous solution of hydrochloric acid to form a starch solution, adding an anthocyanin to the starch solution to form a system, and subjecting the system to a high hydrostatic pressure treatment; and
   2) Subjecting a mixture obtained from the high hydrostatic pressure treatment to low-temperature storage.

2. The method according to claim 1, wherein, in step 1), the starch is at least one selected from the group consisting of potato starch, corn starch, amylose, and amylopectin; the aqueous solution of hydrochloric acid has a pH value of 3 to 5; and
   a mass-volume ratio of the starch, in grams, to the aqueous solution of hydrochloric acid, in milliliters, is between 1:1000 and 1:10.

3. The method according to claim 1, wherein in step 1), the anthocyanin comprises an anthocyanin monomer, a glycosylated/acylated anthocyanin, a small-molecular-weight aggregate of an anthocyanin, a mixture of anthocyanins, or a crude extract of anthocyanin; and
   the system has an anthocyanin concentration of $10^{-6}$ to $10^{-1}$ g/L.

4. The method according to claim 1, wherein in step 1), the high hydrostatic pressure treatment is conducted at a pressure of 100 to 600 MPa; and
   the high hydrostatic pressure treatment is conducted for a time period of 1 to 20 minutes.

5. The method according to claim 1, wherein in step 2), the low-temperature storage is conducted at a temperature of 0 to 10° C. and maintained for a time period of up to 30 days.

6. The method according to claim 1, further consisting of an operation of subjecting the mixture obtained from the low-temperature storage to centrifugal separation to collect a liquid starch-anthocyanin complex;
   wherein the operation further comprises an operation of freeze drying the obtained liquid starch-anthocyanin complex to obtain a solid anthocyanin-starch complex.

7. A method of processing and storage of foods rich in anthocyanins, comprising
   1) Adding a starch to an aqueous solution of hydrochloric acid to form a starch solution, adding an anthocyanin to the starch solution to form a system, and subjecting a resulting system to a high hydrostatic pressure treatment; and
   2) Subjecting a mixture obtained from the high hydrostatic pressure treatment to low-temperature storage.

8. The method according to claim 7, wherein
   in step 1), the anthocyanin is selected from the group consisting of an anthocyanin monomer, a glycosylated/acylated anthocyanin, a small-molecular-weight aggregate of an anthocyanin, a mixture of anthocyanins, and a crude extract of an anthocyanin; and
   the system has an anthocyanin concentration of $10^{-6}$ to $10^{-1}$ g/L.

9. The method according to claim 7, wherein in step 1), the high hydrostatic pressure treatment is conducted at a pressure of 100 to 600 MPa; and
   the high hydrostatic pressure treatment is conducted for a time period of 1 to 20 minutes.

10. The method according to claim 7, wherein in step 2), the low-temperature storage is conducted at a temperature of 0 to 10° C. and
    is maintained for a time period of up to 30 days.

* * * * *